July 10, 1928.  1,676,478
R. C. CHESHIER
THERMOSTATIC CONTROL
Filed July 13, 1925
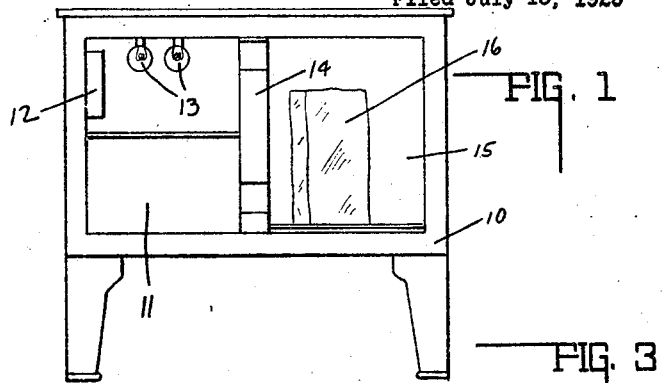
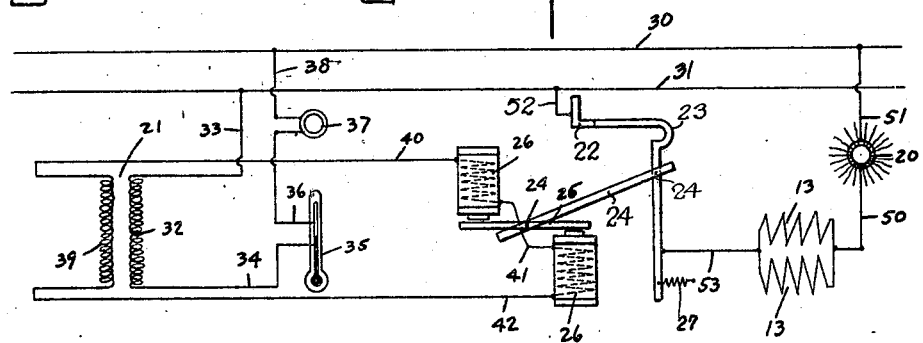
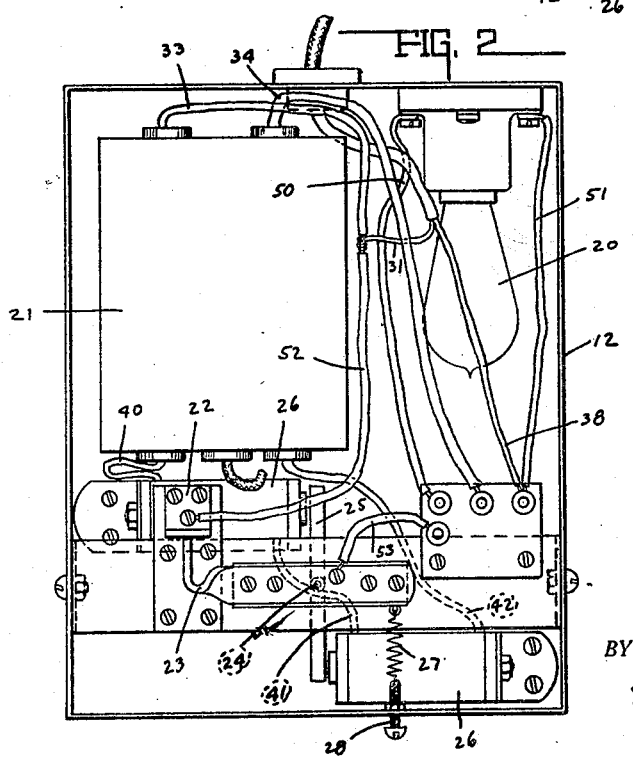
INVENTOR.
REUEL C. CHESHIER.
BY
ATTORNEYS.

Patented July 10, 1928.

1,676,478

UNITED STATES PATENT OFFICE.

REUEL C. CHESHIER, OF FRANKFORT, INDIANA, ASSIGNOR TO SCHLOSSER BROTHERS, INCORPORATED, OF FRANKFORT, INDIANA.

THERMOSTATIC CONTROL.

Application filed July 13, 1925. Serial No. 43,283.

This invention relates to a cabinet and a control therefor whereby the temperature therein is maintained at a predetermined degree.

The chief feature of the invention consists in the heating circuit and a control circuit associated therewith for maintaining a compartment or the like at a predetermined temperature below which the temperature will not fall, and above which the temperature will not rise, said circuits being automatic in their action.

The chief feature of the invention consists in the association of a normally closed switch in a heat supplying circuit and the maintenance of said switch in open position, when the temperature exceeds a predetermined temperature, through a temperature responsive switch, itself normally in open circuit position when the heating circuit is in closed circuit position.

A further feature of the invention consists in the provision of signal lamps or indicators for indicating the operative condition of the circuits.

The full nature of the invention will be understood from the accompanying drawings and the following description and claims:

In the drawings Fig. 1 is an elevational view of a cabinet. Fig. 2 is a similar view of the control mechanism included in both circuits, the same being shown enlarged. Fig. 3 is a wiring diagram of said circuits, the mechanical connection therebetween being duplicated therein.

In the drawings 10 indicates a cabinet having a compartment 11 adapted to be maintained at a predetermined temperature or at a minimum temperature. A control box 12 may be mounted therein and suitable heating units 13 may be similarly included. Herein said heating units are shown in Fig. 1 as resistance lamps. A partition 14 within the cabinet 10 forms a compartment 15 adapted to receive the cooling medium such as ice 16 or the like, and the air in the compartment is adapted to circulate through the compartment 15 into the compartment 11 and thus cool the compartment 11. When the temperature in the compartment 11 falls below the predetermined temperature the resistance units 13 are energized and supply heat to said compartment and thus raise the temperature to the predetermined temperature whereupon through the control mechanism indicated generally at 12, the resistance units are cut out.

In Fig. 2 the control box 12 is shown including a pilot light 20, a transformer 21, a stationary switch contact 22 and a movable switch contact 23 pivotally supported by a pivot 24, said pivot also carrying an armature 25. The armature is actuated by a pair of differentially arranged coils 26. A spring 27 adjustably mounted by the adjusting bolt 28 is connected to the movable switch member 23 and normally tends to maintain switch member 23 in electrical contact with the contact 22.

In Fig. 3 there is illustrated a wiring diagram. The same comprises a pair of supply lines 30 and 31. The primary 32 of the transformer 21 is connected by line 33 to line 31 and is connnected by line 34 to one terminal of a thermal responsive element 35 herein shown in the form of a thermometer having a line 36 leading therefrom and to a signal or indicating lamp 37 in turn connected by line 38 to the other supply line 30. The circuit, therefore, includes lines 33, 38, 36 and 34, the signal lamp 37 and primary 32. The circuit is closed through the thermometer 35 when the temperature is such that the mercury or similar thermally responsive fluid bridges the gap between the two terminals associated with the thermometer, said fluid being of a current conducting character. As long as the temperature is that corresponding to the elevation of the mercury column for closing the circuit through line 36, so long will the primary winding be energized. The secondary winding 39 of the transformer 21 is connected by a line 40 to a coil 26 in turn connected by line 41 to another coil 26, said coil being connected by return line 42 to the secondary of the transformer.

An armature 25 is carried by the pivotally supported support 24. Also carried by said pivotally supported support 24 or pin is the movable switch member 23 normally maintained in closed circuit relation to contact 22 by spring 27.

When the temperature in the compartment in which thermometer 35 is positioned rises to that temperature corresponding to the elevation of the connection of line 36 through the thermometer, then the circuit will be closed through the primary winding and the indicating lamp or signal 37 and the secondary will be energized, thus supplying low voltage current to the coils 26, which coils immediately tilt the armature 25 together with the pin 24, which tilts switch member 23. As long as the secondary 39 is energized the coils are energized and the switch member 23 is maintained in open circuit relation to contact 22. Whenever the temperature in the compartment controlled by the thermometer 35 falls below the level of the thermometer connection thru line 36, the primary winding will be deenergized, likewise the secondary and the coils. Spring 27 then becomes operative to return the armature 25 to its original position and switch member 23 into closed circuit position.

Herein the resistances 13 for supplying heat to the compartment controlled by the thermometer 35, are shown connected in parallel. These resistances 13 are connected by line 50 to lamp 20 and by line 51 said lamp is connected to one of the supply mains 30. The other supply line 31 is connected by line 52 to the stationary switch contact 22. A line 53 is in electrical connection with the movable contact 23 and is also connected to the resistance units 13. Whenever switch contact 23 engages contact 22, the circuit is closed providing the same is operative. If the same is operative signal lamp 20 will be energized, providing the lamp is operative. If lamp 20 is energized lamp 37 should not be energized, and when lamp 37 is energized, lamp 20 should be deenergized. Thus, unless one of the lamps is always energized there is a failure in the system. If lamp 20 is the energized lamp and its illumination varies from that normally obtainable, such variation usually indicates that one of the heating elements 13 is burned out or disconnected and that the heating devices should be examined.

An examination of the primary control circuit indicates that the high resistance primary winding is in series with the indicating lamp and the thermometer, and therefore but little current flows through the thermometer. The secondary winding is of the low voltage variety and therefore supplies current to the coils 26 at a relatively low voltage but a relatively high amperage, that is five to six times the current flowing through the primary circuit. It will be noted that the control circuit consists of two parts, the primary circuit and the secondary circuit, and that the control circuit is mechanically connected to the heating circuit but is responsive thereto as previously described.

The foregoing control is adaptable for many uses, but it is particularly applicable where it is desired to prevent the temperature of a compartment from falling below a predetermined minimum. It will be noted that the arrangement of the indicating devices is such that at all times if the system is operative, the operative condition will be indicated. If desired, however, either or both signals may be omitted. Furthermore, where low voltage and considerable current is available, it will be desirable to replace the transformer coupled circuits by a single circuit having a relatively high resistance.

The invention claimed is:

1. In combination, a source of electrical energy, three electrical circuits, only two of which are directly connected to said source of electrical energy, one of said source connected circuits and the remaining circuit being magnetically coupled together, and means in each of said remaining circuit and the other source connected circuit and mechanically connected together, whereby an operative control in the first source connected circuit is imparted upon the second source connected circuit.

2. In combination, a source of electrical energy, three electrical circuits, only two of which are connected to said source, one of said source connected circuits and the remaining circuit being magnetically coupled together, means in each of the remaining circuit and the other source connected circuit and mechanically connected together for operation, thermal means in the other or second mentioned source connected circuit, and thermal responsive means in the first mentioned source connected circuit and responsive to said thermal means.

In witness whereof, I have hereunto affixed my signature.

REUEL C. CHESHIER.